United States Patent

Chen

[11] Patent Number: 6,105,599
[45] Date of Patent: Aug. 22, 2000

[54] TRANSPORTING WATER DEVICE

[76] Inventor: Chung-Min Chen, 58, Ma Yuan West St., Taichung, Taiwan

[21] Appl. No.: 09/085,268

[22] Filed: May 26, 1998

[51] Int. Cl.$^7$ .................................. E03B 5/02; E03C 1/02
[52] U.S. Cl. .................. 137/216.1; 137/357; 137/565.17
[58] Field of Search ................................ 137/216.1, 357, 137/565.01, 565.17, 565.34, 247.39, 593

[56] References Cited

U.S. PATENT DOCUMENTS

| | | | |
|---|---|---|---|
| 352,833 | 11/1886 | Mott | 137/357 X |
| 1,430,611 | 10/1922 | Antonsanti | 137/565.34 X |
| 1,482,376 | 2/1924 | Anderson | 137/565.34 |
| 1,560,679 | 11/1925 | Elliott | 137/357 X |
| 1,769,836 | 7/1930 | Holmes | 137/216.1 |
| 2,205,305 | 6/1940 | Northon | 137/216.1 |
| 2,267,354 | 12/1941 | Northon | 137/216.1 X |
| 3,102,799 | 9/1963 | Kiekhaefer | 137/593 X |
| 3,448,759 | 6/1969 | Peerman | 137/357 |
| 4,515,180 | 5/1985 | Napolitano | 137/565.17 |
| 4,519,418 | 5/1985 | Fowler | 137/565.34 X |
| 5,032,290 | 7/1991 | Yamagata et al. | 137/357 X |

*Primary Examiner*—John Rivell

[57] ABSTRACT

A transporting water device has a water pipe connected to a water conduit and a water tank, an upper switch disposed on an upper end of the water pipe, a lower switch disposed on a lower end of the water pipe, a pump disposed on the water conduit to pump water to a water tower, a water outlet tank connected to the water conduit, an inner pressure tank disposed in the water outlet tank, a ventilation hole formed on an upper portion of the water outlet tank, and a faucet disposed on the water outlet tank and communicating with the water outlet tank.

1 Claim, 4 Drawing Sheets

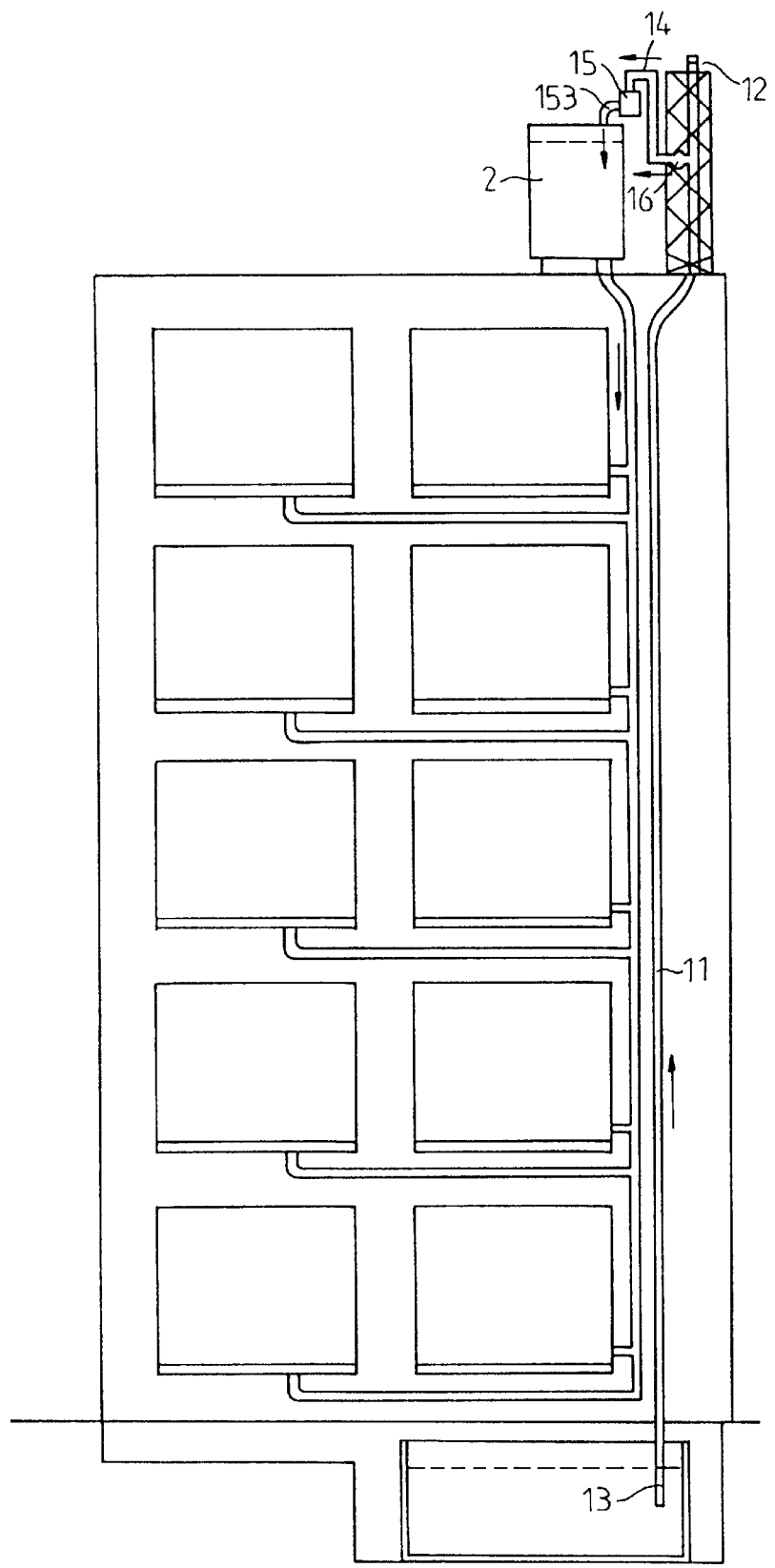
F I G. 2

TRANSPORTING WATER DEVICE

BACKGROUND OF THE INVENTION

The present invention relates to a transporting water device which can transport water to a water tower. More particularly, the present invention relates to a transporting water device which can save energy.

Referring to FIG. 1, a conventional transporting water device comprises a water pipe 31 connected to a water tower 4 and a water tank 3, and a pump 41 disposed on the water pipe 31 to pump water from the water tank 3 to the water tower 4. When the pump 41 does not operate, the water in the water pipe 31 will flow downward. When the pump 41 operates again, the pump 41 will rotate at idle.

SUMMARY OF THE INVENTION

An object of the present invention is to provide a transporting water device which can save energy.

Another object of the present invention is to provide a transporting water device which can transport water to a water tower.

Accordingly, a transporting water device comprises a water pipe connected to a water conduit and a water tank, an upper switch disposed on an upper end of the water pipe, a lower switch disposed on a lower end of the water pipe, a pump disposed on the water conduit to pump water to a water tower, a water outlet tank connected to the water conduit, an inner pressure tank disposed in the water outlet tank, a ventilation hole formed on an upper portion of the water outlet tank, and a faucet disposed on the water outlet tank and communicating with the water outlet tank. The water tower is disposed under the faucet. The lower switch is closed. The upper switch is opened so that water infuses the water pipe. The upper switch is closed. The lower switch is opened. The pump begins to operate. Water flows from the water pipe to the water conduit, to the inner pressure tank, to the water outlet tank, and to the faucet.

BRIEF DESCRIPTION OF THE DRAWINGS

FIG. 2 is a schematic view illustrating a transporting water device of a preferred embodiment in accordance with the present invention;

DETAILED DESCRIPTION OF THE INVENTION

Figure 1:
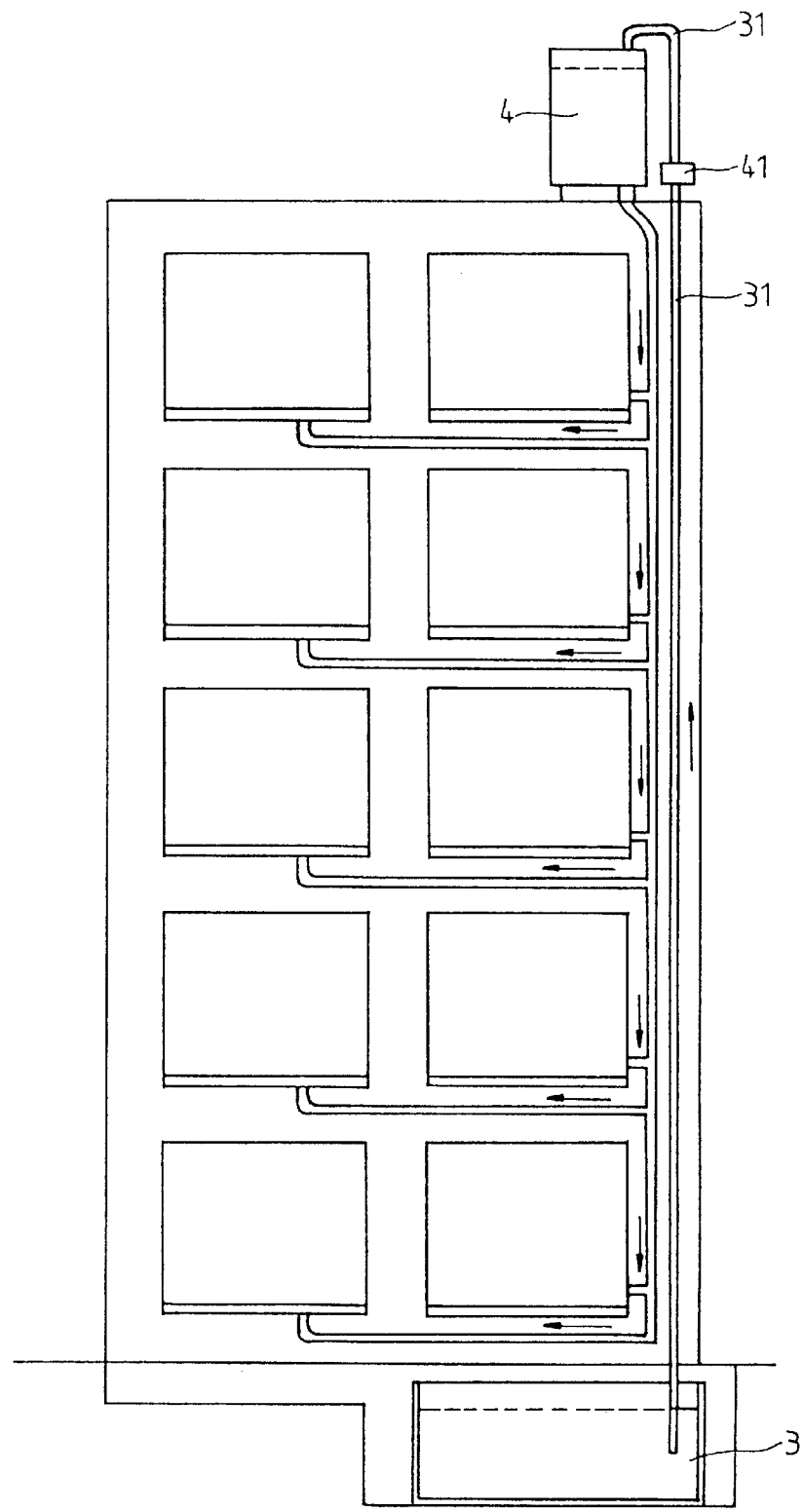
FIG. 1 is a schematic view illustrating a conventional transporting water device of the prior art.
Figure 3:
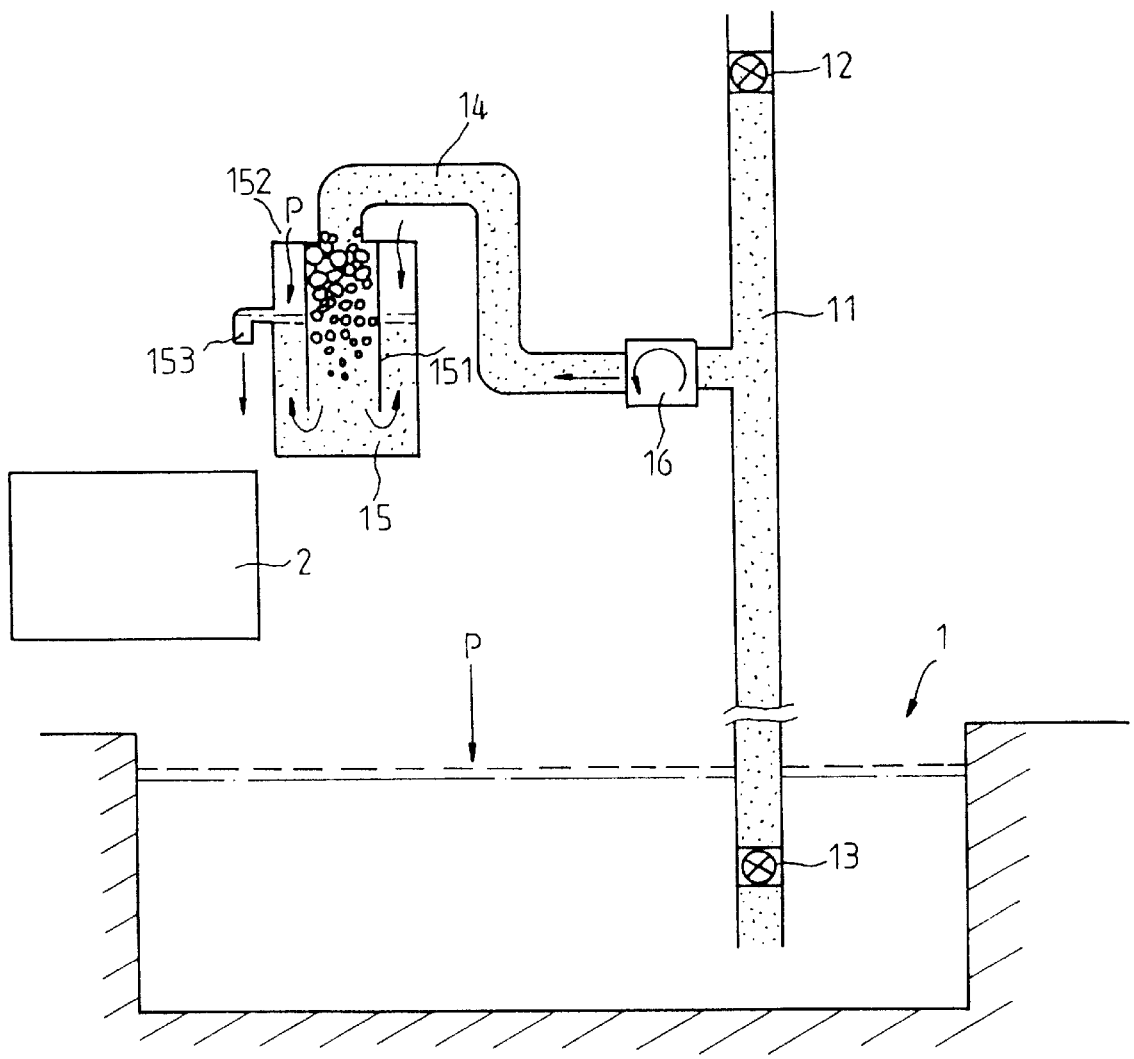
FIG. 3 is a schematic view illustrating a process of transporting water of a preferred embodiment in accordance with the present invention.
Figure 4:
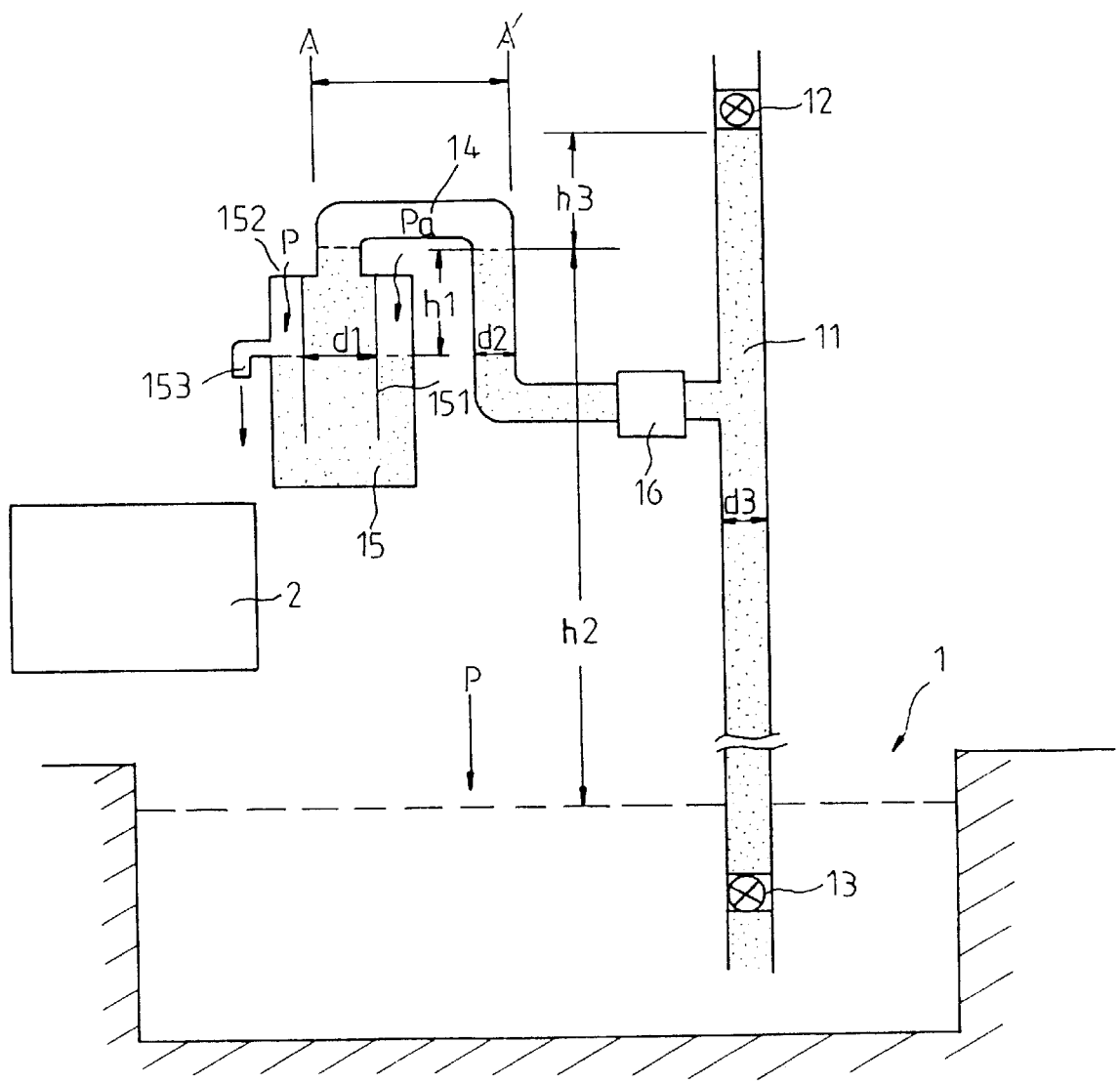
FIG. 4 is a schematic view illustrating a balance of water pressure of a preferred embodiment in accordance with the present invention.

Referring to FIGS. 2 to 4, a transporting water device comprises a water pipe 11 connected to a water conduit 14 and a water tank 1, an upper switch 12 disposed on an upper end of the water pipe 11, a lower switch 13 disposed on a lower end of the water pipe 11, a pump 16 disposed on the water conduit 14 to pump water to a water tower 2, a water outlet tank 15 connected to the water conduit 14, an inner pressure tank 151 disposed in the water outlet tank 15, a ventilation hole 152 formed on an upper portion of the water outlet tank 15, and a faucet 153 disposed on the water outlet tank 15 and communicating with the water outlet tank 15. The water tower 2 is disposed under the faucet 153.

The lower switch 13 is closed.

The upper switch 12 is opened so that water infuses the water pipe 11.

The upper switch 12 is closed.

The lower switch 13 is opened.

The pump 16 begins to operate.

Water flows from the water pipe 11 to the water conduit 14, to the inner pressure tank 151, to the water outlet tank 15, and to the faucet 153.

An air pressure in the water conduit 14 is indicated as Pa.

The air pressure of the atmosphere is indicated as P.

The height between the faucet 153 and the water level of the upper portion of the water conduit 14 is indicated as h1.

The height between the water level of the water tank 1 and the water level of the upper portion of the water conduit 14 is indicated as h2.

The height between the upper switch 12 and the water level of the upper portion of the water conduit 14 is indicated as h3.

The present invention is not limited to the above embodiment but various modification thereof may be made. Furthermore, various changes in form and detail may be made without departing from the scope of the present invention.

I claim:

1. A transporting water device comprises:

a water pipe connected to a water conduit and a water tank, an upper switch disposed on an upper end of the water pipe, a lower switch disposed on a lower end of the water pipe, a pump disposed on the water conduit to pump water to a water tower, a water outlet tank connected to the water conduit, an inner pressure tank disposed in the water outlet tank, a ventilation hole formed on an upper portion of the water outlet tank, a faucet disposed on the water outlet tank and communicating with the water outlet tank, and the water tower disposed under the faucet.

* * * * *